United States Patent [19]

Ohbu et al.

[11] 4,152,472

[45] May 1, 1979

[54] GALVANIZED FERROUS ARTICLE FOR LATER APPLICATION OF PAINT COATING

[75] Inventors: Misao Ohbu; Kazuhiro Tano, both of Kitakyushu, Japan

[73] Assignee: Nippon Steel Corporation, Tokyo, Japan

[21] Appl. No.: 833,289

[22] Filed: Sep. 14, 1977

Related U.S. Application Data

[63] Continuation of Ser. No. 628,494, Nov. 3, 1975, abandoned, which is a continuation of Ser. No. 451,230, Mar. 14, 1974, abandoned.

[30] Foreign Application Priority Data

Mar. 19, 1973 [JP] Japan ................................ 48/31713

[51] Int. Cl.$^{2}$ ........................ B05D 1/18; B32B 15/04

[52] U.S. Cl. .................................. 427/433; 427/321; 427/434 R; 428/457; 428/659

[58] Field of Search ............... 427/433, 434 R, 434 D, 427/321, 311, 310, 313, 312; 428/645, 646, 653, 659, 457

[56] References Cited

U.S. PATENT DOCUMENTS

| | | | |
|---|---|---|---|
| 1,764,132 | 6/1930 | Wehr et al. | 428/659 |
| 3,320,040 | 5/1967 | Roe et al. | 428/659 |
| 3,325,282 | 6/1967 | Mayer et al. | 428/653 |
| 3,505,043 | 4/1970 | Lee et al. | 428/659 |
| 4,029,478 | 6/1977 | Lee | 427/433 |
| 4,056,366 | 11/1977 | Lee et al. | 428/653 |
| 4,056,657 | 11/1977 | Leckie et al. | 427/433 |

FOREIGN PATENT DOCUMENTS 1127407 9/1968 United Kingdom.

*Primary Examiner*—George F. Lesmes
*Assistant Examiner*—R. Eugene Varndell, Jr.
*Attorney, Agent, or Firm*—Toren, McGeady and Stanger

[57] ABSTRACT

A galvanized ferrous article having an adherent, ductile and highly corrosion resistant coating of galvanizing alloy which presents a matted surface which is free or substantially free of spangle and which is capable, upon application of a paint coating thereon, of strongly anchoring the paint coating to the galvanized coating, said galvanizing alloy comprising a zinc base alloy containing 3-10% preferably 3.5-10% by weight of aluminum and one or more elements of magnesium, calcium, beryllium, titanium and copper in amounts within the range specified in terms of the total weight of the lead and tin contained in the galvanizing alloy.

2 Claims, 21 Drawing Figures m/m
Ca
10
8
6
4
2
0
0.05
0.1
0.15
0.2
0.3
0.4
0.5
0.6
Ca (%)

m/m
Ti
10
8
6
4
2
0
0.05
0.1
0.15
0.2
0.3
0.4
0.5
0.6
Ti (%)
Width of peel-off of paint coating in Scratched portion by taping after 20-day salt spray
Bad surface appearance

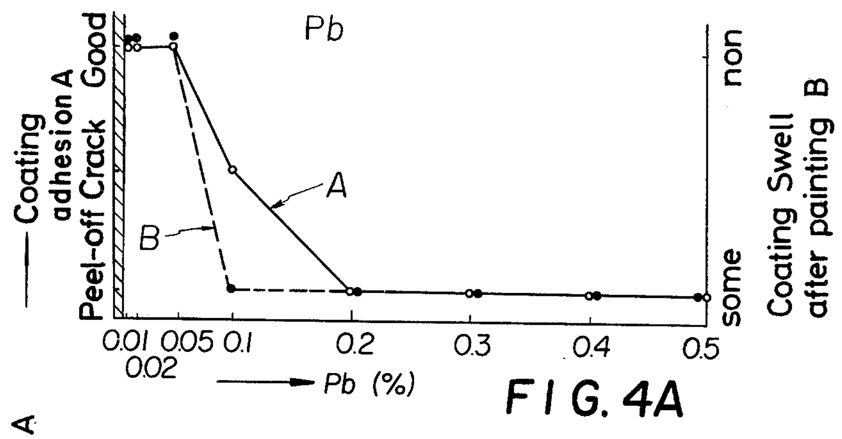
FIG. 4A
FIG. 4B
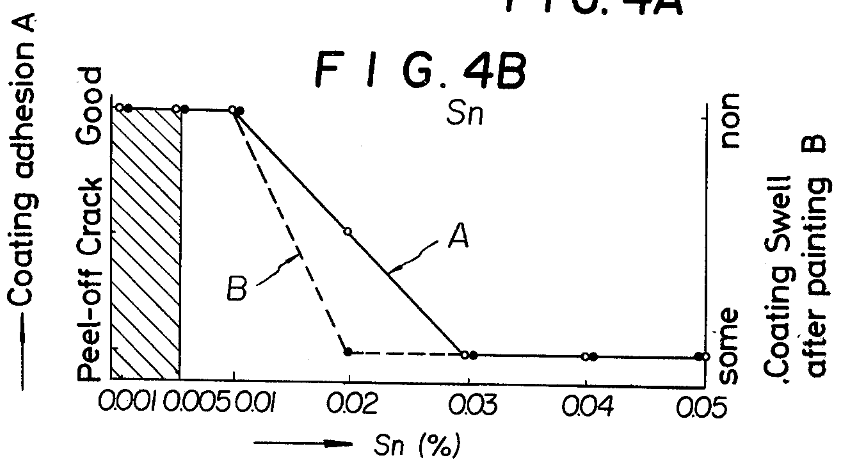
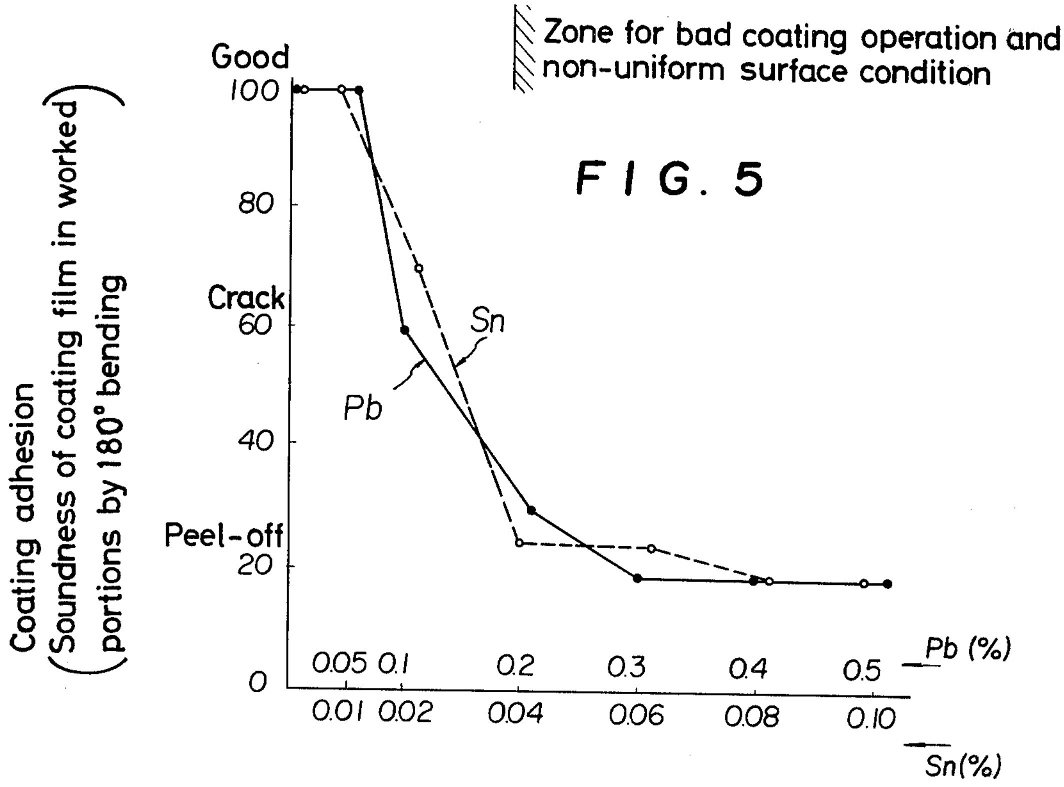
FIG. 5

Changes of coating layer after 180° bending test o - Good adhesion

▲ - Crack

× - Peel-off

Bad surface appearance

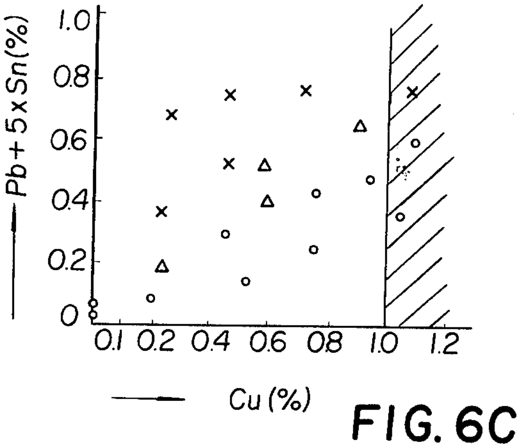
FIG. 6C
FIG. 6D
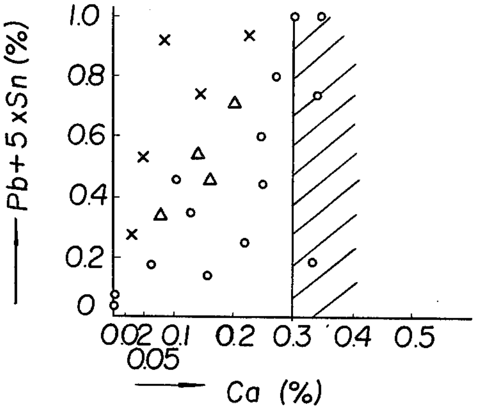
FIG. 6E
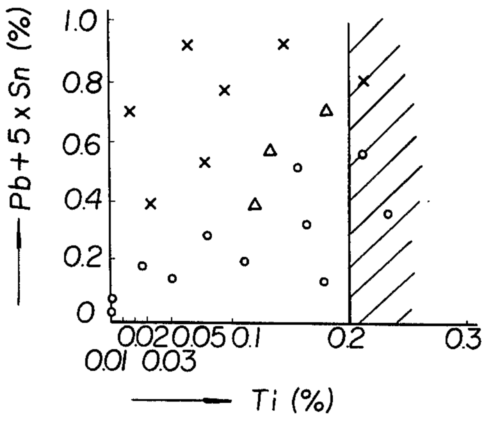

PRIOR ART GALVANIZED STEEL

THIS INVENTION (G)

PRIOR ART GALVANIZED STEEL

THIS INVENTION

GALVANIZED FERROUS ARTICLE FOR LATER APPLICATION OF PAINT COATING

This is a continuation of application Ser. No. 628,494, filed on Nov. 3, 1975 now abandoned, which, in turn, is a continuation of application Ser. No. 451,230, filed on Mar. 14, 1974, now abandoned.

This invention relates to a method of producing galvanized ferrous articles having a zinc base alloy coating adapted for later application of a paint coating as in color galvanized steel sheet and strip. More particularly, it relates to a novel galvanizing alloy which provides galvanized steel sheet and strip having improved corrosion resistance as the base material on which a paint coating is to be applied and provides a galvanized coating surface which is free or substantially free of spangle and which exhibits an excellent affinity to the paint coating applied thereon.

A large proportion of the presently produced galvanized ferrous strips are coated with siccactive organic coating compositions such as paint, laquer, enamel and the like as represented by color galvanized steel sheet for attaining the required life-time of the final product. In the case of color galvanized steel sheets, for example, there has been a gradual but continual growth in the demand therefor since their introduction to the market is 1961. According to the statistics compiled from The Galvanized Ferrous Metal Society of Japan, it is reported that the actual production of color galvanized steel sheets throughout the year of 1971 amounts up to 610,000 tons, reaching the level almost equal to that of plain galvanized steel sheets manufactured for domestic demand. Further, some of the plain galvanized steel sheets after have been coated with paint are used to make automatic vending machine parts, automobile parts and various electrical goods. As the number of days of the use of such color galvanized steel products increases, however, it is verified that the life-time of the color galvanized steel products are shorter than was expected. Upon examination, it has been found that the premature destruction of the galvanized coating is due to its dissolution in corrosive media entering through the pin-holes and scrached portions present in the paint coating. On this account, in order to increase the life-time, galvanized steel sheets having coatings of increased thicknesses have in recent years come into widespread use as the base material for producing color galvanized steel sheets.

Another problem encountered in producing color galvanized steel sheets by using conventional galvanized steel sheets as the base material is the elimination of spangles with depressed boundaries which when they exist on the surfaces of the galvanized steel sheets to be painted or coated with baked enamels tend to show their relief pattern through the applied coatings. The spangles are usually eliminated by contacting the galvanized article after emergence from the molten bath while the coating is substantially entirely molten with wet steam, or by subjecting the galvanized article to a galvannealing step which promotes diffusion of iron from the ferrous base material into the galvanized coating, or by other methods.

Accordingly, it is an object of the present invention to provide a novel method of producing galvanized ferrous metal article having a smooth, non-spangled or substantially spangle free, readily paintable surface coating of zinc base alloy without the necessity of spangle elimination procedure.

Another object of the present invention is to provide novel galvanized ferrous article having an adherent, ductile and highly corrosion resistant coating of zinc base alloy which present a matted surface which is particularly adapted for the later application of a paint coating thereon.

In addition to optimizing the galvanized coating properties and surface appearance for the later application of a paint coating, the present invention imparts economics and minimizes the galvanizing cost to an extent not available with the galvanizing bath lacking the feature of the present invention.

Other features and advantages will become apparent to those skilled in the art from the following detailed description taken in conjunction with the accompanying drawings wherein:

FIG. 1 is a graph illustrating the effect of the bath composition on the corrosion resistance for various Zn-Al alloys as determined by the exposure to outdoor damp air.

FIGS. 2*a* and 2*b* are graphs illustrating the effects of Pb and Sn on the adhesion and ductility of the galvanized coating to the ferrous metal base.

FIGS. 3*a* through 3*e* are graphs illustrating the effects of Mg, Be, Cu, Ca and Ti on the adhesion stability of a paint coating applied thereon against salt-fog corrosion.

FIGS. 4*a* and 4*b* are respectively a graph illustrating the effects of Pb and Sn on the adhesion and ductility of the galvanized coating.

FIG. 5 is a graph illustrating the effects of Pb and Sn on the adhesion.

FIGS. 6*a* through 6*e* are graphs illustrating the effects of Mg, Be, Cu, Ca and Ti on the adhesion and ductility of the galvanized coating in connection with the total weight of the Pb and Sn contained in the galvanized coating.

FIGS. 7*a* and 7*b* are respectively a graph showing the relation between the contents of Pb and Sn and the corrosion resistance of the coating.

Figure 1:
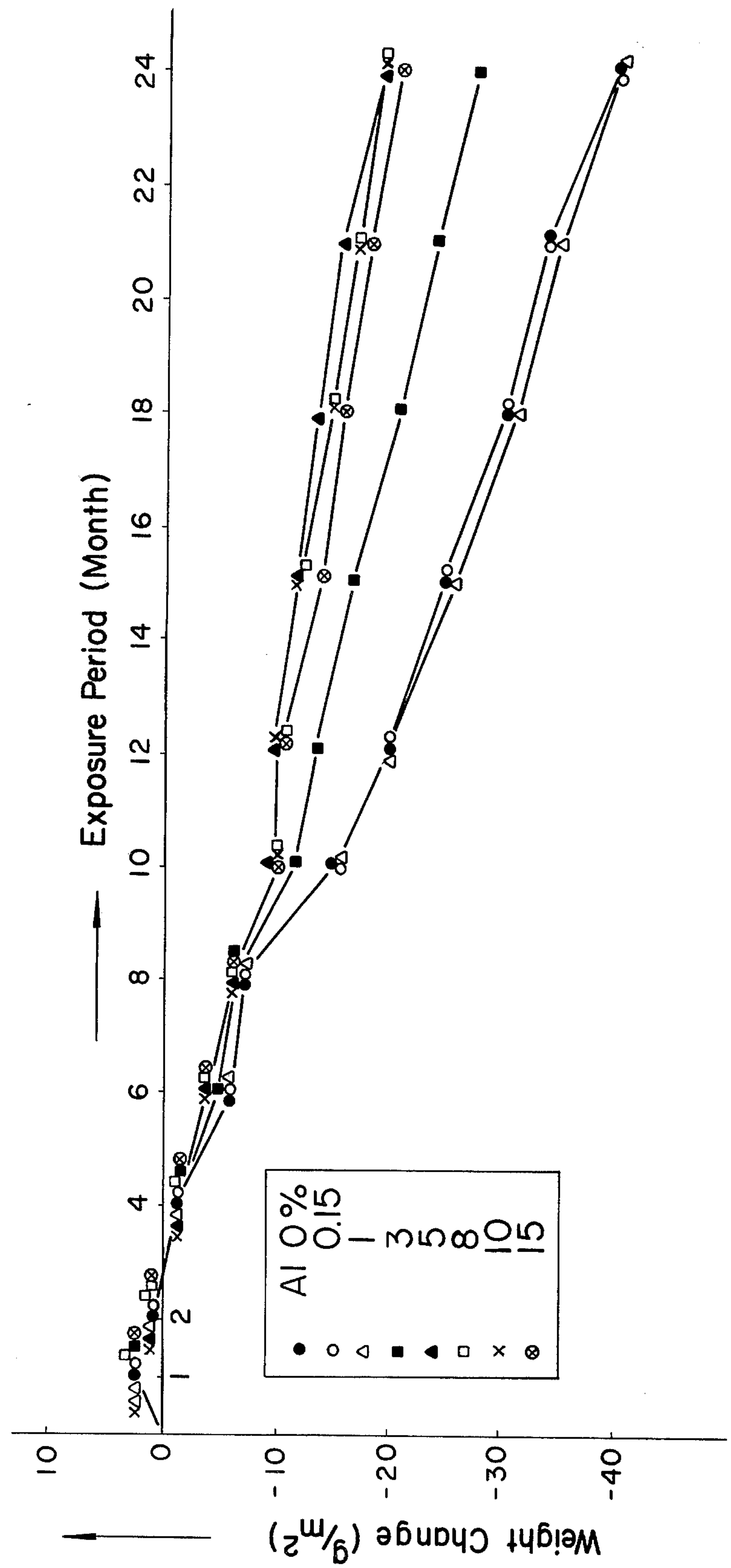

The invention will be described in connection with continuous galvanizing operations. However, it is understood that the invention is not to be limited to such operations. The present inventors have first made an attempt to increase the corrosion resistance of galvanized coatings on steel surfaces by adding aluminum to the hot dip galvanizing bath of commertial grade zinc. It is now found from FIG. 1 that a considerable increase in corrosion resistance is effected with a zinc base alloy coating containing up to about 3% preferably 3.5% aluminum when it is subjected to outdoor corrosion test, and that the weight loss of the galvanized coating containing more than 5% aluminum due to the exposure to the outdoor air conditions wherein the dissolution in the rain water occurrs is about a half time as large as that of a zinc coating containing 0.15% by weight of aluminum. This indicates that the life time required for the galvanized steel material to produce red rust can be doubled. It is also found that the incorporation of aluminum with a concentration of more than 3% improves the adhesion of a paint coating to the resultant zinc-aluminum alloy coating surface so that when the paint coating is scratched, the loss of adhesion caused by corrosion from the scratched portions is minimized. These zinc-aluminum alloy coatings afford an outstanding combination of good corrosion resistance and improved adhesion of the paint coating applied thereon which combination will increase remarkably the lifetime of the final product.

In continuous galvanizing processes such as the Sendzimir type of process including a pretreatment operation in a reducing atmosphere of hydrogen, the use of aluminum at a concentration above about 10% in the galvanizing bath creates serious operating difficulties because of the increased viscosity of the resulting zinc-aluminum alloy bath. For example, zinc-aluminum alloy coatings containing more than 10% aluminum have been found to present commercially unattractive surfaces and to severely crack and scale off when subjected to a conventional bend test, due to the formation of a large amount of intermetallic compound at the interface between the coating and the ferrous base material. On the bases of these facts, it has first been recognized that the hot-dip zinc base alloy coatings containing aluminum should be limited to those having an aluminum concentration ranging from 3% to 10%, preferably 3.5% to 10% by weight.

On the other hand, the employment of a readily available zinc spelter in preparing the galvanized bath of the present invention by adding 3–10% aluminum to a melt of the zinc spelter have been found to cause the adhesion and ductility of the galvanized coating to become inferior to those of the usual zinc coatings and to render the final product unsuitable as the base material for application of a paint coating. Another drawback is that when a paint coating is applied on the surface of such a galvanizing alloy coating, the galvanized coating is swollen in the form of dots so that the surface of the painted final product has an unpleasing appearance. The cause of these two drawbacks is uncertain, but it is very likely the behavior of the hydrogen dissolved by diffusion into the ferrous base material when the ferrous base material has been subjected to the pretreatment in a hydrogen reducing furnace. The present inventors have conducted various investigations and found that these two drawbacks are particularly dependent upon the concentrations of lead and tin in the galvanized coating and therefore can be obviated by restricting their contents, although it is generally necessary to add a certain amount of lead or tin to the galvanizing bath to facilitate the galvanizing operation and make the galvanized coating uniform.

Figure 2A:
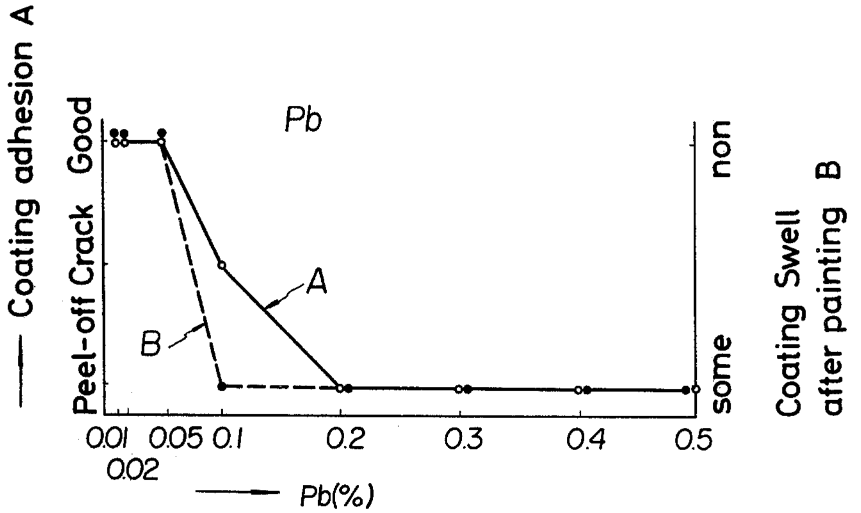
Figure 2B:
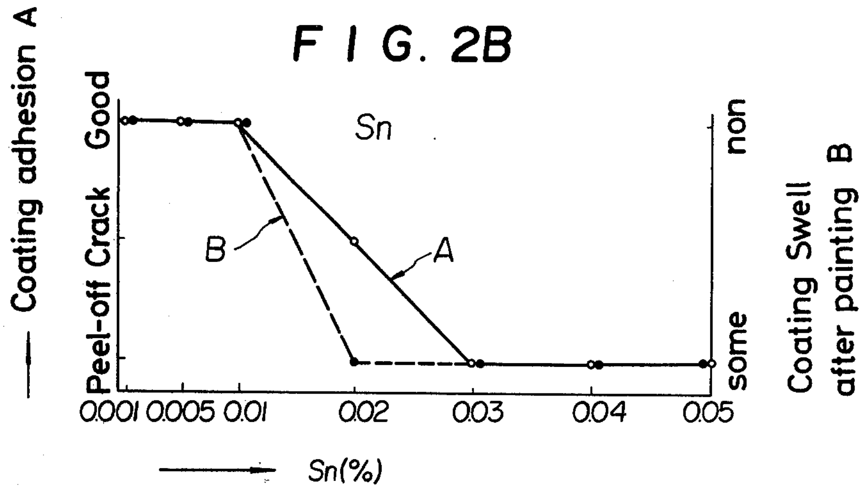
Figure 3A:
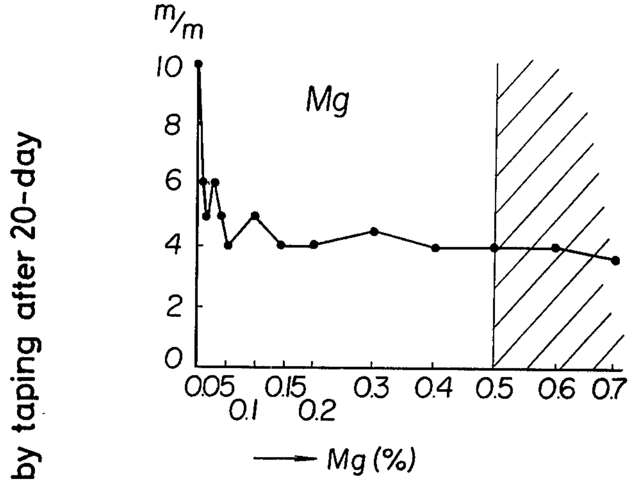
Figure 3B:
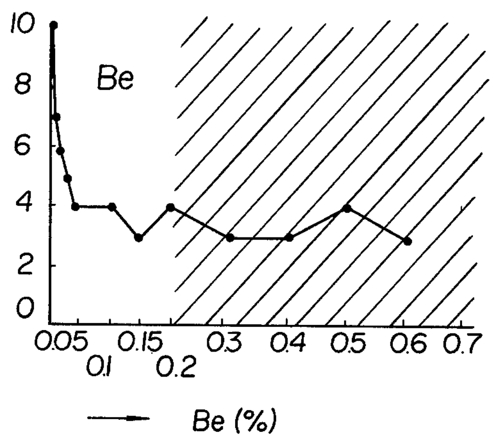
Figure 3C:
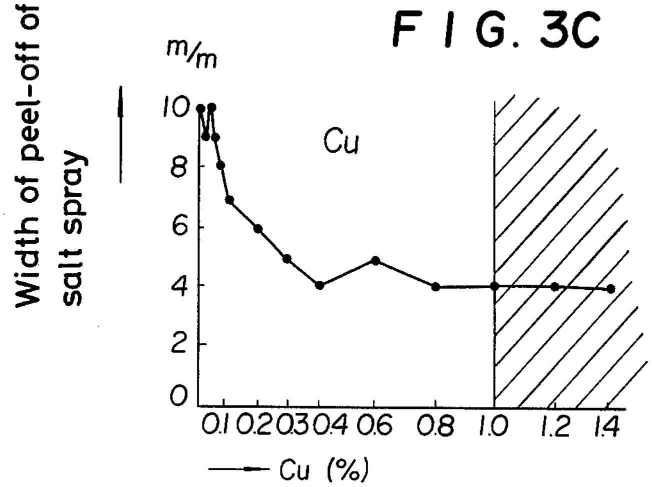
Figures 3D, 3E:
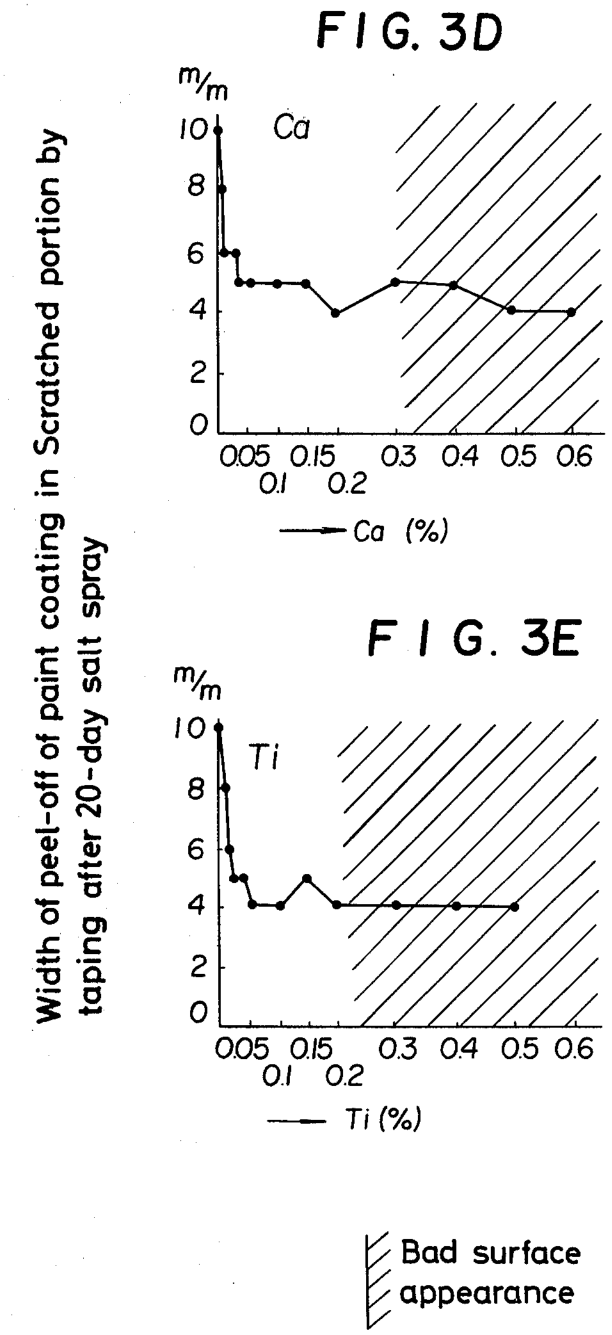
Figure 6A:
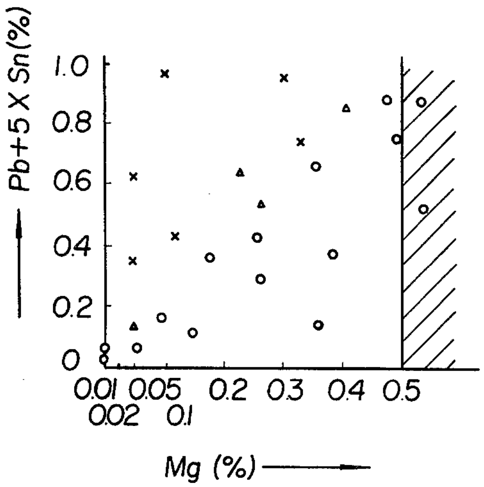
Figure 6B:
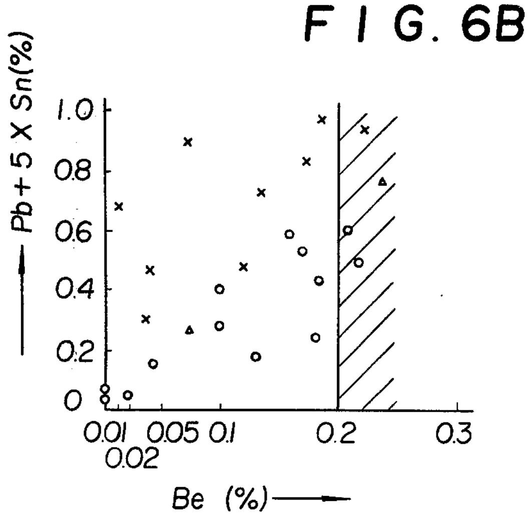

In FIG. 2, there is shown relationships between the adhesion and ductility of the galvanized coating (5% A1) and the lead or tin content, and between the lead or tin content and the tendency of galvanized coating to swell in the form of dots when a paint coating is applied thereon. It will be appreciated from FIG. 2 that galvanized coatings containing less than 0.10% by weight lead and less than 0.02% by weight tin are free from the above-mentioned two drawbacks.

In the prior art, there are several types of galvanized ferrous article having an adherent ductile and corrosion resistant coating. Of these, British Pat. No. 1,127,407 discloses coated ferrous products having coatings which comprise from 5% to 24% aluminum and containing lead in an amount less than 0.6%, the balance being zinc. In comparison with the British Patent, however, it is to be noted that the present invention contemplates the use of aluminum and lead for achieving improvements not only in the corrosion resistance, adherence and ductility of the galvanized coating but also in the adherence of the paint coating to the galvanized coating surface and the prevention of the galvanized coating from swelling in the form of dots when the paint coating is applied, while controlling the lead content and tin content simultaneously.

Using the galvanizing alloy compositions of the present invention, galvanized ferrous metal article having a markedly improved corrosion resistance and having a coating surface which is rendered suitable for application of a paint coating can be obtained. With such a galvanized ferrous metal article adapted for use as the base material for application of a paint coating, it is desirable to further improve the adhesion of the paint coating film to the surface of the galvanized coating with stability against corrosion. With regard to this, it is proposed to apply to ferrous metal surfaces a galvanizing material comprising a zinc-aluminum alloy with limited amounts of lead and tin and containing one or more elements selected from the group consisting of magnesium, calcium, beryllium, titanium and copper. These elements have the following effects:

(1) The thin film formed on the surface of the galvanized coating is made by inactivation caused by the inclusion of the element more protective to corrosion to retard the dissolving speed of the galvanized coating in corrosive media.

(2) The inactivated thin film suppresses the reaction between the paint coating material and galvanized coating material, and (3) The surface of the galvanized coating is matted so that the paint coating is firmely anchored to the base material of the galvanized ferrous metal article.

In order to demonstrate these effects in improving the stability of adhesion of a paint film against corrosion, the following test was carried out. The results of such test are shown in FIGS. 3*a* through 3*e*.

Salt spray test—A number of galvanized ferrous metal panels were cleaned, phosphated with a phosphating solution and rinsed with water. The dried phosphated panels were then coated with a paint sold under the tradename of Amilaque No. 1 (made by Kansai Paint Co., Ltd.) which was then baked for 20 minutes at 120° C. The paint film thickness was 20 microns. The paint film on each panel was ruptured down to the galvanized coating surface by use of a recording stylus under a constant load on the surface of each panel. The scored panels were then subjected to the salt-spray test described in JIS Z-2371. After the panels had been exposed to salt-spray atmosphere for 20 days, they were removed, washed with water and dried. A pressure sensitive tape was then applied along the scribed line and removed. The panels were then inspected to determine the width of paint peeling-off along the scratched lines from the metal substrate. The loss of adhesion caused by corrosion from the scratch lines was measured in millimeter of the width by which the ordinates of the graphs in FIGS. 3 are scaled.

It is understood from FIGS. 3a through 3e that a considerable decrease in the loss of adhesion is effected with a galvanized coating containing in excess of 0.01% of magnesium, in excess of 0.02% calcium, in excess of 0.01% beryllium, in excess of 0.02% titanium or in excess of 0.1% copper, each being in a weight basis. An additional inclusion of each element was found to have no substantial favorable influence on the adhesion stability of the paint film. Also excessive contents of each element in the galvanizing bath result in dross formation in the bath and as well as coloration of the coating surface, thereby increasing the possibility of imperfections occurring in the coating and on the surface thereof due to entrainment attachment of dross therein and thereto. The upper limit of the range of contents on a weight basis is 0.5% for magnesium, 0.3% for calcium, 0.2% for beryllium, 0.2% for titanium and 1.0% for copper.

In case when one or more of Mg, Ca, Be, Ti and Cu are added, too small contents of Pb and Sn deteriorate coating feasibility, uniformity of surface condition and lower commercial value of the products. In this regard, Pb and Sn sould be at least 0.007% and 0.005% respectively as shown in FIG. 4.

As stated before, among the incident impurity of the galvanizing material, are lead and tin which have an adverse effect on the improvement in the adhesion and ductility of the galvanized coating and in the prevention of the galvanized coating from swelling in the form of dots when a paint coating is applied thereon. The contributions of the lead and tin content to the adverse effect has been determined by the 180° bending test, and the results of such test are shown in FIG. 5. It is understood from FIG. 5 that the tin content has an adverse effect 5 times as large as the lead content. Consequently, in order to effect an equivalent improvement in the adhesion and ductility of the galvanized coating, it is necessary to control the total weight of lead and tin in accordance with following formula $$M=[Pb](\%)+5\times[Sn](\%)$$

The before specified ranges of the elements are valid for $M<0.10\%$, but not suitable for $M>0.10\%$. Experiments have been made to determine the lower limit of the range for each element. The results are shown in FIGS. 6a through 6e. In order to effect good adhesion of the galvanized coating containing lead and tin in amount above 0.10% defined in terms of M, it is necessary to add one or more elements in amounts within the range set forth below.

$0.4\ M \leq Mg < 0.5\%$
$0.3\ M \leq Ca < 0.3\%$
$0.3\ M \leq Be < 0.2\%$
$0.3\ M \leq Ti < 0.2\%$
$1.5\ M \leq Cu < 1.0\%$ The upper limits of the above elements are defined from the view point of the surface appearance (dross formation, adhesion of oxide and coloring) of the coating as shown in FIG. 6.

Hereinbefore, it has been stated that Pb and Sn should be at least 0.007% and 0.005% respectively in order to assure uniformity of the surface condition of the coatings.

Figure 7:
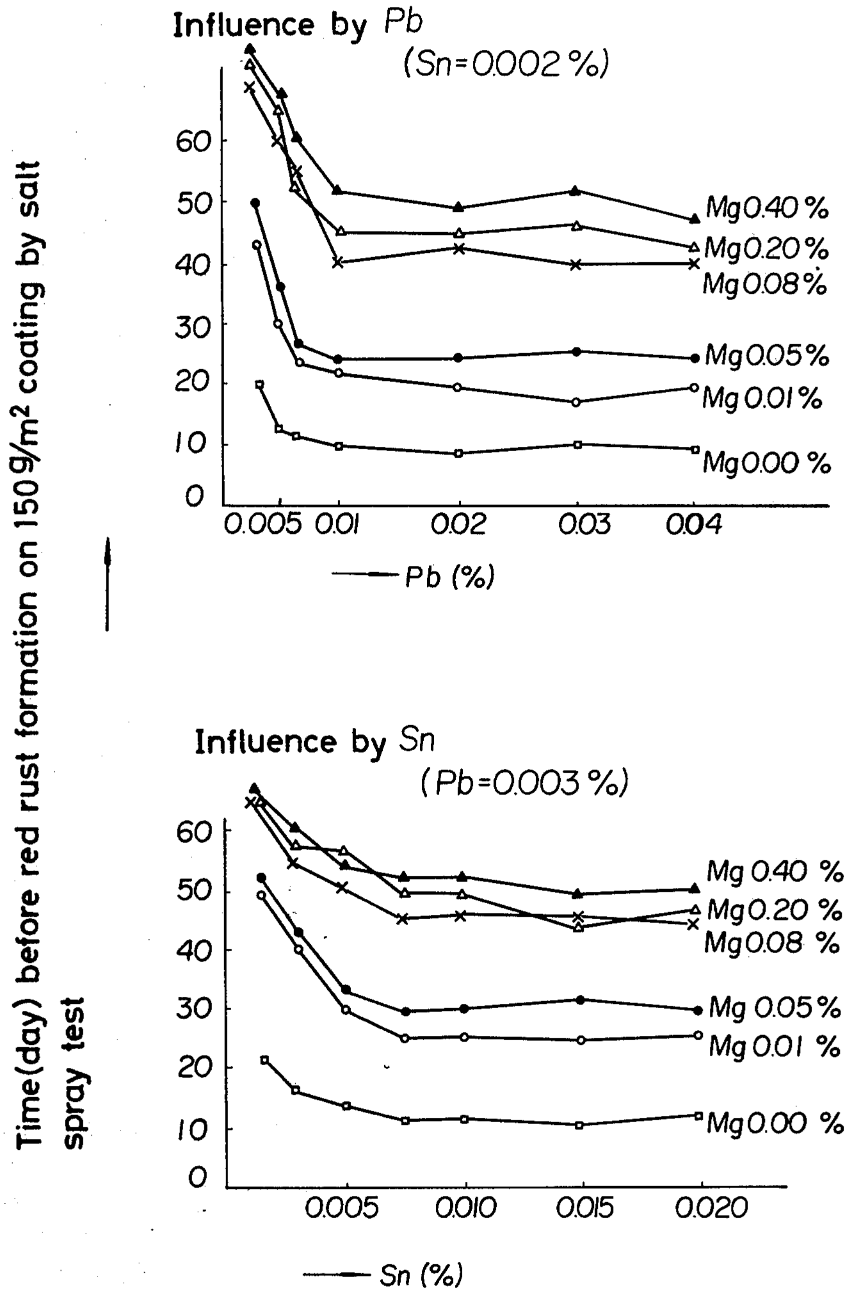

However, the present inventors have discovered that, when Pb and Sn contents are maintained less than 0.007% and 0.005%, respectively, in the case when one or more of Mg, Ca, Be, Ti and Cu are added, corrosion resistance of the coatings is remarkably enhanced as shown in FIGS. 7a and 7b. This phenomenon is very remarkable when the addition of Mg is at least 0.08%, and in case of Cu addition less than 0.25% the stability of the coating film is not so good, and in case of Cu addition less than 0.75%, the coating feasibility is deteriorated. With respect to Ca, Be and Ti, the corrosion resistance and coating feasiblity are not substantially influenced by their addition amount.

The present invention has been defined from the point of the bath composition, but the coating composition obtained from the bath composition is substantially the same as the bath composition. Therefore, the same things can be said for the bath composition and the coating composition.

The examples of the present invention will be set forth under.

EXAMPLE I

A number of steel strips (equivalent to JIS SPCC class) of 0.5 m/m×914 m/m×coil were hot dip coated with the galvanizing bath compositions shown in Table I in a Sendzimir type of process. The zinc base metal employed in Baths A to E is a distillated zinc of Special High Grade described in JIS H2107. The zinc base metal employed in Baths F through K is a zinc of commercial grade described in JIS H2107.

Figure 8:
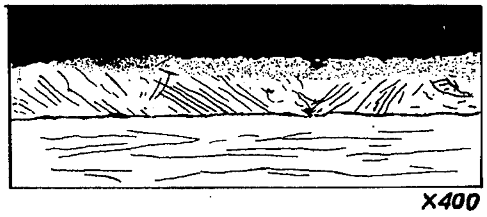
FIG. 8 shows a microphotograph of the cross-sectional structure enlarged 400 times of a prior art galvanized ferrous base material having a coating of zinc 1A.
Figure 9:
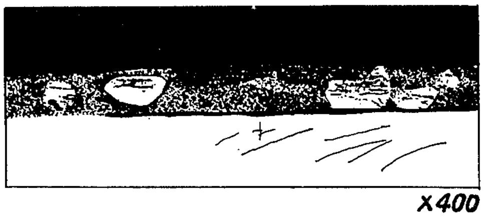
FIG. 9 is a microphotograph of the cross-sectional structure enlarged 400 times of a galvanized ferrous base material having a coating of alloy I-G within the scope of the invention.

In Table II, various properties of the obtained galvanized coatings are summerized. The cross-sectional microstructures of galvanized coating I-A and I-G are shown in FIGS. 8 and 9, respectively.

Table I

| | Bath Composition | | | | | | | | | |
|---|---|---|---|---|---|---|---|---|---|---|
| No. | Al | Fe | Pb | Sn | Mg | Ca | Be | Ti | Cu | Remark |
| I-A | 0.16 | 0.04 | 0.162 | 0.054 | 0.001> | 0.001> | 0.001> | 0.001> | 0.001> | Prior art zinc bath |
| I-B | 3.55 | 0.17 | 0.163 | 0.049 | " | " | " | " | " | Prior art zinc bath + aluminum |
| I-C | 5.23 | 0.25 | 0.165 | 0.048 | " | " | " | " | " | " |
| I-D | 7.12 | 0.28 | 0.159 | 0.051 | " | " | " | " | " | " |
| I-E | 9.26 | 0.32 | 0.158 | 0.051 | " | " | " | " | " | " |
| I-F | 3.42 | 0.17 | 0.054 | 0.012 | " | " | " | " | " | within the invention |
| I-G | 5.19 | 0.25 | 0.062 | 0.009 | " | " | " | " | " | " |
| I-H | 7.25 | 0.29 | 0.054 | 0.010 | " | " | " | " | " | " |
| I-I | 9.12 | 0.33 | 0.073 | 0.011 | " | " | " | " | " | " |
| I-J | 2.54 | 0.15 | 0.051 | 0.011 | " | " | " | " | " | Outside the invention |
| I-K | 11.12 | 0.35 | 0.052 | 0.009 | " | " | " | " | " | " |

Table II

| No. | Coating weight (g/m$^2$ surface) | Coating adhesion *1 | Coating surface appearance | Coating swell after application of paint | Creep along scribed line on paint film after salt spray test (m/m) *2: 1 (day) | 5 (") | 10 (") | 20 (") | Width of paint peeling off by outdoor exposure test (m/m) *2: 6 (month) | 1 (year) | 2 (year) | Weight change of alloy coating by weather test before paint coating (g/m$^2$ surface): 1 (year) | 2 (year) |
|---|---|---|---|---|---|---|---|---|---|---|---|---|---|
| I-A | 90 | O | Spangle large | non | 1 | 5 | 17 | 23 | 1 | 2 | 4 | −20 | −40 |
| I-B | 80 | Δ | minute | some | 0 | 2 | 4 | 6 | 0 | 1 | 2 | −14 | −29 |
| I-C | 83 | x | " | " | 0 | 1 | 3 | 5 | 0 | 0.5 | 1 | −10 | −20 |
| I-D | 81 | x | " | " | 0 | 1 | 3 | 5 | 0 | 0.5 | 1 | −9 | −20 |
| I-E | 85 | x | " | " | 0 | 1 | 3 | 5 | 0 | 0.5 | 1 | −10 | −19 |
| I-F | 80 | O | " | non | 0 | 2 | 4 | 6 | 0 | 1 | 2 | −13 | −26 |
| I-G | 82 | O | almost free | " | 0 | 1 | 3 | 5 | 0 | 0.5 | 1 | −10 | −20 |
| I-H | 80 | O | minute | " | 0 | 1 | 3 | 5 | 0 | 0.5 | 1 | −11 | −19 |
| I-I | 81 | O | " | " | 0 | 1 | 3 | 5 | 0 | 0.5 | 1 | −10 | −21 |
| I-J | 79 | O | small | " | 0 | 2 | 5 | 8 | 0 | 1 | 2 | −17 | −33 |
| I-K | 90 | x | Dross deposition | " | 0 | 1 | 3 | 5 | 0 | 0.5 | 1 | −10 | −21 |

Remarks:
*1 R = 0.5m/m, 180° Roll forming Criterion 0 ...Good Δ...Crack x ...Peel off
*2 Pretreatment for application of paint: A phosphating treatment with Bondelite Z (made by Nihon Parkerizing Co., Ltd.) Coating conditon Paint: Amilaque No.1. Kansai Paint Co., Ltd. (Butylated melamine resing + semi-drying alkyd resin) Coating thickness: 20 microns Baking: At 120° C. for 20 minutes Scrtach: Recording system under a constant load

EXAMPLE II

A number of steel strips (equivalent to JIS SPCC class) of 0.5 m/m×914 m/m×coil were hot dip coated with the galvanizing bath compositions shown in Table III in a Sendzimir type process.

Table III

| No. | Bath composition (%): Al | Fe | Pb | Sn | Mg | Ca | Be | Ti | Cu | Remarks |
|---|---|---|---|---|---|---|---|---|---|---|
| II-L | 0.15 | 0.04 | 0.165 | 0.054 | 0.001> | 0.001> | 0.001> | 0.001> | 0.001> | Prior art zinc bath equivalent to IA |
| II-M | 5.15 | 0.26 | 0.060 | 0.010 | 0.001> | 0.001> | 0.001> | 0.001> | 0.001> | Equivalent to IG within the invention |
| II-N | 5.05 | 0,25 | 0.054 | 0.011 | 0.04 | 0.001> | 0.001> | 0.001> | 0.001> | Within the Invention |
| II-O | 5.02 | 0.25 | 0.073 | 0.009 | 0.001> | 0.05 | 0.001> | 0.001> | 0.001> | " |
| II-P | 4.91 | 0.23 | 0.074 | 0.009 | 0.001> | 0.001> | 0.03 | 0.001> | 0.001> | " |
| II-Q | 5.12 | 0.26 | 0.059 | 0.012 | 0.001> | 0.001> | 0.001> | 0.03 | 0.001> | " |
| IIR | 4.85 | 0.23 | 0.062 | 0.013 | 0.001> | 0.001> | 0.001> | 0.001> | 0.31 | " |
| II-S | 4.99 | 0.23 | 0.061 | 0.012 | 0.03 | 0.04 | 0.001> | 0.001> | 0.001> | " |
| II-T | 5.12 | 0.25 | 0.072 | 0.010 | 0.001> | 0.001> | 0.02 | 0.001> | 0.001> | " |
| II-U | 5.13 | 0.25 | 0.072 | 0.010 | 0.001> | 0.001> | 0.02 | 0.001> | 0.001> | " |
| II-V | 4.95 | 0.24 | 0.082 | 0.010 | 0.001> | 0.001> | 0.02 | 0.02 | 0.001> | " |
| II-W | 4.98 | 0.24 | 0.079 | 0.013 | 0.02 | 0.02 | 0.001> | 0.02 | 0.001> | |

Note: The zinc base metal employed in Bath L is a distillated zinc of Special High Grade specified in JIS H2107. The zinc base metal employed in Baths M through W is a zinc of commercial grade specified in JIS H2107.

Various properties of the obtained galvanized coating are summarized in Table IV Table IV

| No. | Coating weight (g/m$^2$ surface) | Coating adhesion *1 | Coating surface appearance | Coating swell after application of paint | Creep along scribed line on paint film after salt spray test (m/m) *2: 1 (day) | 5 (") | 10 (") | 20 (") | Width of paint peeling off by outdoor exposure test *2: 6 (month) | 1 (year) | 2 (year) | Weight change of alloy coating by weather test before paint coating (g/m$^2$ surface): 1 (year) | 2 (year) |
|---|---|---|---|---|---|---|---|---|---|---|---|---|---|
| II-L | 92 | O | Spangle large | non | 1 | 6 | 18 | 23 | 1 | 2 | 4 | −20 | −39 |
| II-M | 85 | O | almost free | " | 0 | 1 | 3 | 5 | 0 | 0.5 | 1 | −9 | −19 |
| II-N | 82 | O | minute | " | 0 | 1 | 2 | 4 | 0 | 0.5> | 1> | −8 | −16 |
| II-O | 79 | O | " | " | 0 | 1 | 2 | 4 | 0 | 0.5> | 1> | −8 | −17 |
| II-P | 80 | O | " | " | 0 | 1 | 1-2 | 4 | 0 | 0.5 | 1> | −9 | −16 |
| II-Q | 76 | O | " | " | 0 | 1 | 2 | 4 | 0 | 0.5> | 1> | −9 | −16 |
| II-R | 78 | O | " | " | 0 | 1 | 2 | 4 | 0 | 0.5> | 1> | −9 | −17 |
| II-S | 83 | O | " | " | 0 | 1> | 1-2 | 3-4 | 0 | 0.5> | 1> | −8 | −17 |
| II-T | 80 | O | " | " | 0 | 1> | 2 | 3-4 | 0 | 0.5> | 1> | −7 | −15 |
| II-U | 81 | O | " | " | 0 | 1> | 2 | 4 | 0 | 0.5 | 1> | −8 | −16 |
| II-V | 82 | O | " | " | 0 | 0.5 | 1-2 | 3-4 | 0 | 0.5> | 1> | −7 | −14 |

Table IV-continued

Various properties of the obtained galvanized coating are summarized in Table IV

| | | | | | Various properties of coatings | | | | | | | | |
|---|---|---|---|---|---|---|---|---|---|---|---|---|---|
| | | | | | Creep along scribed line on paint film after salt spray test (m/m) *2 | | | | Width of paint peeling off by outdoor exposure test *2 | | | Weight change of alloy coating by weather test before paint coating (g/m² surface) | |
| No. | Coating weight (g/m² surface) | Coating adhesion *1 | Coating surface appearance | Coating swell after application of paint | 1 (day) | 5 (") | 10 (") | 20 (") | 6 (month) | 1 (year) | 2 (year) | 1 (year) | 2 (year) |
| II-W | 82 | O | " | " | 0 | 0.5 | 1–2 | 3–4 | 0 | 0.5> | 1> | −7 | −14 |

*1 Refers to Remarks of Table II
2Refers to Remarks of Table II

Table V

EXAMPLE III
A number of steel strips (equivalent to JIS SPCC class) of 0.5m/m × 914 m/m × coil were hot dip coated in the various coating baths of compositions shown in Table V by a Sendimir type continuous process.

| | Bath composition (%) | | | | | | | | | |
|---|---|---|---|---|---|---|---|---|---|---|
| No. | Al | Fe | Pb | Sn | Mg | Ca | Be | Cu | Ti | Remarks |
| III-A | 0.15 | 0.04 | 0.159 | 0.031 | 0.01> | 0.02> | 0.01> | 0.01> | 0.01> | Prior art zinc bath |
| III-B | 5.15 | 0.23 | 0.162 | 0.030 | 0.01> | 0.01> | 0.01> | 0.01> | 0.01> | Outside the invention |
| III-C | 5.24 | 0.24 | 0.200 | 0.029 | 0.20 | 0.01> | 0.01> | 0.01> | 0.01> | Within the invention |
| III-D | 4.85 | 0.24 | 0.198 | 0.032 | 0.01> | 0.15 | 0.01> | 0.01> | 0.01> | " |
| III-E | 4.98 | 0.21 | 0.254 | 0.035 | 0.01> | 0.01> | 0.16 | 0.01> | 0.01> | " |
| III-F | 5.31 | 0.25 | 0.185 | 0.035 | 0.01> | 0.01> | 0.01> | 0.86 | 0.01> | " |
| III-G | 4.96 | 0.27 | 0.224 | 0.029 | 0.01> | 0.01> | 0.01> | 0.01> | 0.13 | " |
| III-H | 5.29 | 0.25 | 0.298 | 0.033 | 0.19 | 0.01> | 0.15 | 0.01> | 0.01> | " |
| III-I | 5.01 | 0.23 | 0.201 | 0.034 | 0.01> | 0.12 | 0.01> | 0.20 | 0.01> | " |
| III-J | 6.91 | 0.28 | 0.208 | 0.029 | 0.01> | 0.01> | 0.12 | 0.01> | 0.12 | " |
| III-K | 7.35 | 0.30 | 0.259 | 0.028 | 0.16 | 0.01> | 0.01> | 0.01> | 0.13 | " |
| III-L | 5.05 | 0.24 | 0.211 | 0.028 | 0.15 | 0.01> | 0.11 | 0.01> | 0.11 | " |

Figure 10:
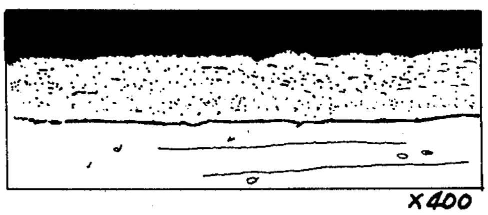
FIG. 10 is a microphotograph of the cross-sectional structure enlarged 400 times of a prior art galvanized ferrous base material having a coating of zinc 3A.
Figure 11:
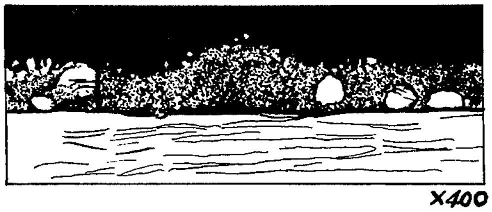
FIG. 11 is a microphotograph of the cross-sectional structure enlarged 400 times of a galvanized ferrous base material having a coating of alloy 3C within the scope of the invention.

Various properties of the obtained galvanized coatings are summerized in Table VI. The cross-sectional microstructures of galvanized coatings III-A and III-G are shown in FIGS. 10 and 11 respectively.

Table VI:

| | | | | | Various properties of coatings | | | | | | | | |
|---|---|---|---|---|---|---|---|---|---|---|---|---|---|
| | | | | | Creep along scribed line on paint film after salt spray test (m/m) *2 | | | | Width of paint peeling off by outdoor exposure test *2 | | | Weight change of alloy coating by weather test before paint coating (g/m² surface) | |
| No. | Coating weight (g/m² surface) | Coating adhesion *1 | Coating surface appearance | Coating swell after application of paint | 1 (day) | 5 (days) | 10 (days) | 20 (days) | 6 (month) | 1 (year) | 2 (year) | 1 (year) | 2 (year) |
| | | | Spangle | | | | | | | | | | |
| III-A | 91 | O | large | non | 1 | 6 | 20 | 25 | 1 | 2 | 4 | −20 | −40 |
| III-B | 85 | x | minute | some | 0 | 1 | 3 | 5 | 0 | 1 | 2 | −10 | −20 |
| III-C | 83 | O | " | non | 0 | 1 | 3 | 5 | 0 | 0.5> | 1> | −9 | −19 |
| III-D | 86 | O | " | " | 0 | 1> | 2–3 | 4 | 0 | 0.5> | 1> | −10 | −19 |
| III-E | 82 | O | " | " | 0 | 0.5 | 2 | 4 | 0 | 0.5> | 1> | −9 | −19 |
| III-F | 79 | O | " | " | 0 | 0.5 | 1–2 | 4 | 0 | 0.5 | 1> | −8 | −18 |
| III-G | 80 | O | " | " | 0 | 1> | 2 | 4 | 0 | 0.5> | 1> | −9 | −19 |
| III-H | 83 | O | " | " | 0 | 1> | 2 | 4 | 0 | 0.5> | 1> | −9 | −20 |
| III-I | 78 | 0 | " | " | 0 | 1> | 2–3 | 4 | 0 | 0.5> | 1> | −10 | −20 |
| III-J | 81 | O | " | " | 0 | 1 | 2 | 4 | 0 | 0.5> | 1> | −9 | −19 |
| III-K | 81 | O | small | " | 0 | 1 | 2 | 4–5 | 0 | 0.5> | 1> | −8 | −18 |
| III-L | 80 | O | minute | " | 0 | 1> | 1–2 | 4 | 0 | 0.5> | 1> | −8 | −17 |

*1, *2: Refer to Remarks of Table II.

EXAMPLE IV. A number of steel strips (equivalent to JIS SPCC class) of 0.5m/m × 914m/m were hot dip coated in various coating baths of compositions shown in Table VII by a Sedimir type continuous process and various properties of thus obtained coated sheets are shown in Table 8.

Table 7

| | Bath Composition | | | | | | | | | |
|---|---|---|---|---|---|---|---|---|---|---|
| No. | Al | Fe | Sn | Pb | Mg | Ca | Be | Ti | Cu | Remarks |
| IV-1 | 0.15 | 0.04 | 0.054 | 0.169 | 0.001> | 0.001> | 0.001> | 0.001> | 0.001> | Prior art within the invention |
| IV-2 | 4.95 | 0.25 | 0.004 | 0.005 | 0.10 | 0.001> | 0.001> | 0.001> | 0.001> | " |
| IV-3 | 5.05 | 0.24 | 0.003 | 0.006 | 0.001> | 0.05 | 0.001> | 0.001> | 0.001> | " |
| IV-4 | 5.01 | 0.24 | 0.004 | 0.007 | 0.001> | 0.001> | 0.03 | 0.001> | 0.001> | " |
| IV-5 | 4.99 | 0.24 | 0.004 | 0.006 | 0.001> | 0.001> | 0.001> | 0.03 | 0.001> | " |
| IV-6 | 4.95 | 0.25 | 0.003 | 0.006 | 0.001> | 0.001> | 0.001> | 0.001> | 0.30 | " |
| IV-7 | 5.09 | 0.23 | 0.002 | 0.005 | 0.09 | 0.04 | 0.001> | 0.001> | 0.001> | " |
| IV-8 | 5.12 | 0.24 | 0.003 | 0.007 | 0.001> | 0.001> | 0.02 | 0.001> | 0.001> | " |
| IV-9 | 5.01 | 0.25 | 0.003 | 0.006 | 0.001> | 0.001> | 0.02 | 0.02 | 0.001> | " |
| IV-10 | 5.02 | 0.22 | 0.004 | 0.005 | 0.001> | 0.001> | 0.02 | 0.02 | 0.20 | " |

Table 7-continued

| No. | Al | Fe | Sn | Pb | Mg | Bath Composition Ca | Be | Ti | Cu | Remarks |
|---|---|---|---|---|---|---|---|---|---|---|
| IV-11 | 5.12 | 0.24 | 0.004 | 0.006 | 0.08 | 0.02 | 0.001> | 0.02 | 0.001> | " |

Note:
The zinc base metal employed in Bath IV-1 is a distillated zinc of Special High Grade specified in JIS H2107.
The zinc base metal employed in Baths IV-2 to IV-11 is a zinc of commercial grade specified in JIS H2107.

Table 8

| | Various properties of coatings | | | | | | | | | | | | |
|---|---|---|---|---|---|---|---|---|---|---|---|---|---|
| | | | | | Creep along scribed line on paint film after salt spray test (m/m) *2 | | | | Width of paint peeling off by outdoor exposure test (m/m)*2 | | | Weight change of alloy coating by weather test before paint coating ($g/m^2$ surface) | |
| No. | Coating weight ($g/m^2$ surface) | Coating adhesion *1 | Coating surface appearance | Coating swell application of paint | 1 (day) | 5 (days) | 10 (days) | 20 (days) | 6 (month) | 1 (year) | 2 (year) | 1 (year) | 2 (year) |
| IIV-1 | 92 | O | Spangle large | non | 1 | 6 | 18 | 23 | 1 | 2 | 4 | −20 | −39 |
| IIV-2 | 82 | O | minute | " | 0 | 0.5 | 1 | 3 | 0 | 0.5> | 1> | −6 | −13 |
| IIV-3 | 80 | O | " | " | 0 | 0,5 | 2 | 3 | 0 | 0.5> | 1> | −6 | −13 |
| IIV-4 | 80 | O | " | " | 0 | 1 | 1.5 | 3 | 0 | 0.5 | 1> | −7 | −12 |
| IIV-5 | 75 | O | " | " | 0 | 1 | 1.5 | 3 | 0 | 0.5> | 1> | −6 | −12 |
| IIV-6 | 81 | O | " | " | 0 | 0.5 | 1 | 2 | 0 | 0.5> | 1> | −6 | −13 |
| IIV-7 | 80 | O | " | " | 0 | 1 | h | 2.5 | 0 | 0.5> | 1> | −6 | −13 |
| IIV-8 | 83 | O | " | " | 0 | 0.5 | 1.5 | 3 | 0 | 0.5> | 1> | −5 | −11 |
| IIV-9 | 83 | O | " | " | 0 | 0.5 | 1.5 | 2.5 | 0 | 0.5 | 1> | −6 | −12 |
| IIV-10 | 79 | O | " | " | 0 | 1 | 2 | 3 | 0 | 0.5> | 1> | −5 | −12 |
| IIV-11 | 83 | O | " | " | 0 | 1 | 2 | 3 | 0 | 0.5> | 1> | −5 | −12 |

*1 *2) Refer to Remarks of Table II

What is claimed is:

1. A method of producing galvanized ferrous strip having a zinc base alloy coating adapted for the later application of a paint coating on the surface thereof which comprises: moving a continuous ferrous strip through a molten zinc base alloy galvanizing bath and delivering galvanized strip from the molten galvanizing bath, said zinc base alloy galvanizing bath containing 4.85–10% by weight of aluminum, 0.007–0.10% by weight of lead, 0.005–0.02% by weight of tin, and one or more members selected from the group consisting of magnesium in an amount of 0.01–0.5% by weight, calcium in an amount of 0.01–0.3% by weight, beryllium in an amount of 0.01–0.2% by weight, titanium in an amount of 0.01–0.2% by weight and copper in an amount of 0.1–1.0% by weight, and the total weight of the other elements being limited to less than 0.5% by weight.

2. A method of producing galvanized ferrous strip having a Zn-Al alloy coating adapted for the later application of a paint coating on the surface thereof which comprises: moving a continuous ferrous strip through a molten Zn-Al alloy galvanizing bath and delivering galvanized strip from the molten galvanizing bath, said zinc base alloy galvanizing bath containing 4.85–10% by weight of aluminum, more than 0.10% by weight of lead, more than 0.02% of tin and one or more members selected from the group consisting of Mg, Ca, Be, Ti and Cu in amounts specified below in terms of the total weight of the lead and tin:

$0.4A \leqq Mg \leqq 0.5\%$ $0.3A \leqq Ca \leqq 0.3\%$ $0.3A \leqq Be \leqq 0.2\%$ $0.3A \leqq Ti \leqq 0.2\%$ $1.5A \leqq Cu \leqq 1.0\%$ (wherein $A = Pb(\%) + 5 \times Sn(\%)$).

* * * * *

UNITED STATES PATENT OFFICE
CERTIFICATE OF CORRECTION

Patent No. 4,152,472 Dated May 1, 1979

Inventor(s) Misao Ohbu, Kazuhiro Tano

It is certified that error appears in the above-identified patent and that said Letters Patent are hereby corrected as shown below:

In the heading of the Patent [30] should read as follows:

[30] Foreign Application Priority Data

March 19, 1973 [JP] Japan,,,,,,,,48-31713

March 19, 1973 [JP] Japan,,,,,,,,48-31714

Signed and Sealed this

*Seventeenth* Day of *July 1979*

[SEAL]

*Attest:*

LUTRELLE F. PARKER

*Attesting Officer* *Acting Commissioner of Patents and Trademarks*